Oct. 23, 1951    C. E. WALTON    2,572,546
RECORDER DRIVE MECHANISM
Filed July 29, 1946    3 Sheets-Sheet 1

Inventor
CECIL E. WALTON
By M. A. Hayes
Attorney

Inventor
CECIL E. WALTON

Oct. 23, 1951 C. E. WALTON 2,572,546
RECORDER DRIVE MECHANISM
Filed July 29, 1946 3 Sheets-Sheet 3
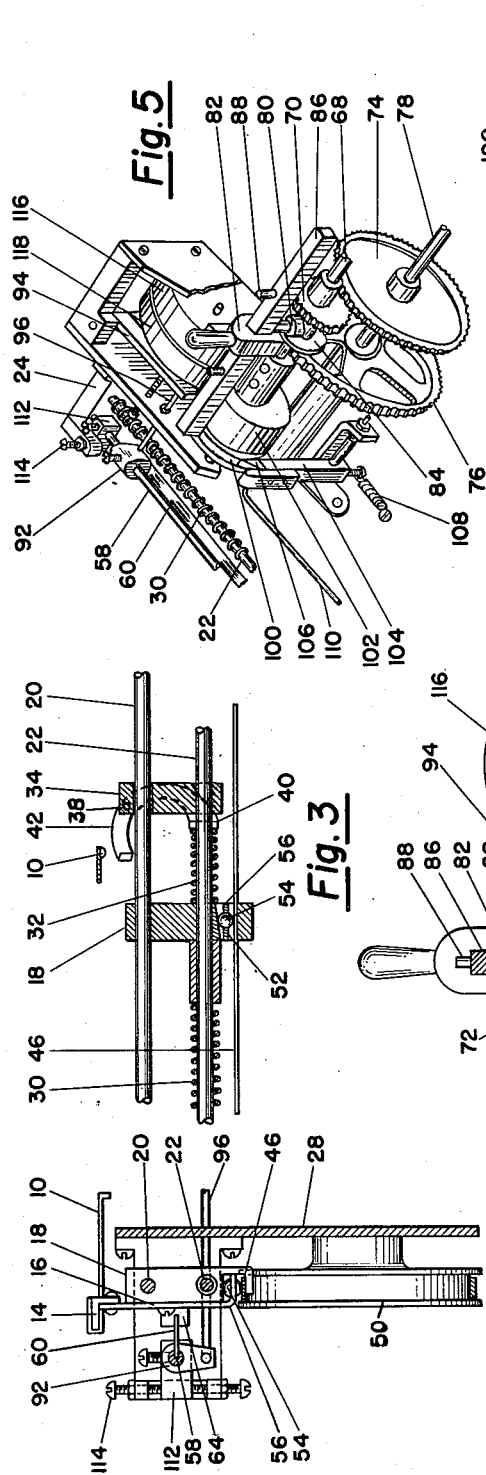
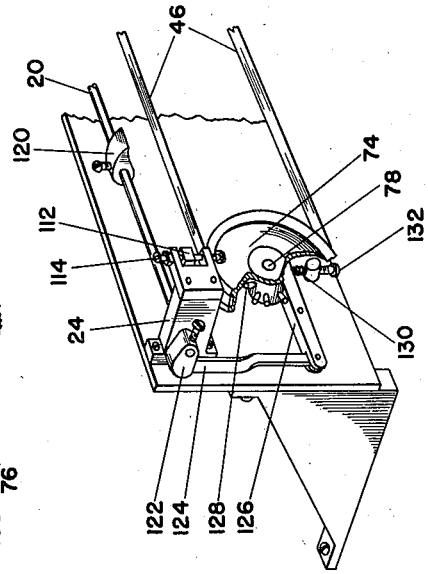
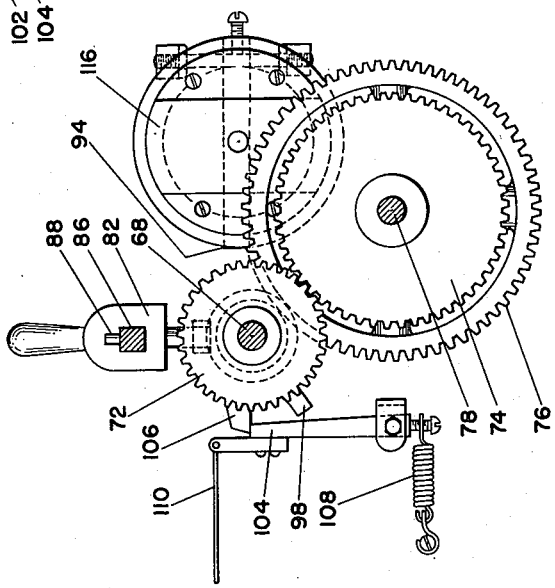
Inventor
CECIL E. WALTON Patented Oct. 23, 1951

2,572,546

UNITED STATES PATENT OFFICE 2,572,546

RECORDER DRIVE MECHANISM

Cecil E. Walton, Cleveland, Ohio, assignor to the United States of America as represented by the Secretary of the Navy Application July 29, 1946, Serial No. 686,919

9 Claims. (Cl. 346—114)

The present invention relates to an improved mechanism for driving chemical sound-range recorders. More particularly it relates to such a device in which all the operations are performed mechanically in contrast to an existing device using electrical contacts and an electrically operated clutch. The existing recorder is built by the Sangamo Electric Company of Springfield, Illinois.

The chemical sound-range recorder is an instrument used in connection with echo-ranging equipment to indicate graphically the distance to the target. In it a stylus is drawn at a constant rate of speed laterally across a moving strip of chemically treated paper. Motion of the stylus commences at the time a sound pulse is sent out by the ranging equipment, and such motion is repeated in conformance with the repetition rate of the transmitted pulse. Thus the speed of the drive mechanism is so selected that each time the ranging equipment pulses, the stylus is just leaving the left-hand margin of the paper. The stylus then moves across the paper at a uniform rate of speed for a distance depending upon the range at which the ranging equipment is operating. Any signal received thereafter by the equipment, such as reverberation or an echo from a target, causes an electric current to flow from the stylus through the paper to a metal roller behind it. This produces a chemical change in the paper resulting in a spot thereon. The target distance may be measured on the paper by means of a suitably calibrated scale.

The previously existent device secured movement of the stylus by the alternate winding and unwinding of a traction cord on a drum, which drum was driven by power applied through an electrically operated clutch. Auxiliary contacts carried by the stylus controlled the operation of this clutch.

The present invention eliminates the winding drum, traction cord, electric clutch and auxiliary contacts by substituting therefor a constantly moving endless belt which drives the stylus carriage by means of a simple grip and suitable triggers for tightening and releasing it.

The invention also resides in certain novel features of component structure and arrangement which facilitate the carrying out of the foregoing substitutions and which contribute both to the simplicity of the recorder and to the reliability of operation as well as to the ease and expeditious manner of operation.

Other objects and advantages of the invention will become apparent from the following detailed description taken in connection with the accompanying drawings, in which:

Fig. 3 is an enlarged view of the stylus showing its construction as well as the location of the belt-gripping ball.

Fig. 4 is a view looking along the belt and illustrating the location of a portion of the tripping mechanism.

Fig. 5 is a perspective view of a portion of the tripping mechanism and the speed changing gears.

Fig. 6 is an end view of the driving gears.

Fig. 7 is an enlarged view of the trip oscillating mechanism.

Figure 1:
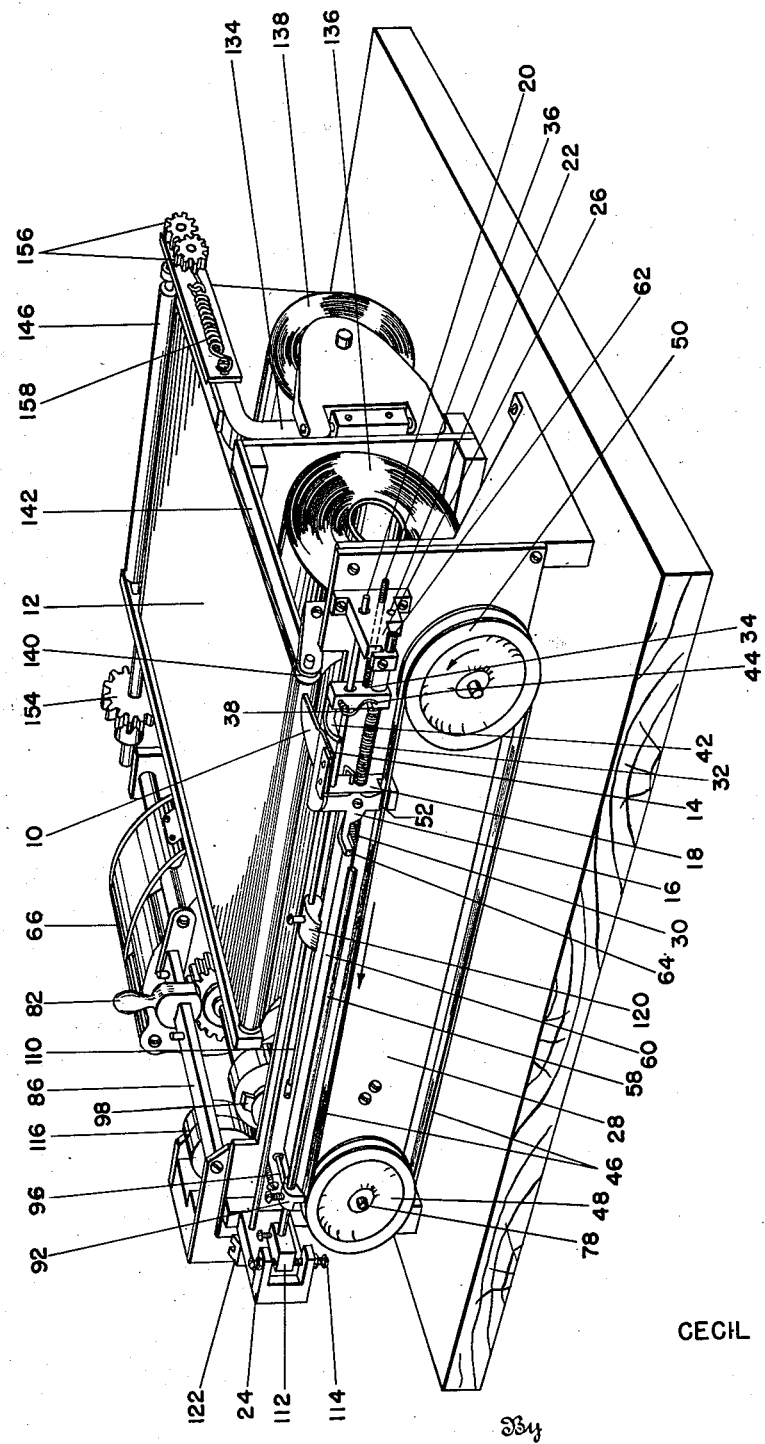
Fig. 1 is a perspective view of the device as seen from the stylus-operating-mechanism side.

While the invention is susceptible of various modifications and alternative arrangements, I have shown in the drawings and will herein describe in detail the preferred embodiments. It is to be understood, however, that I do not intend to limit the invention by such disclosure for I aim to cover all modifications and alternative arrangements falling within the spirit and scope of the invention as defined in the appended claims.

Referring to the illustrations, a stylus 10 is supported over paper 12 by an arm 14 of a pivoted member 16 on a carriage 18. The carriage slides on upper and lower round guide rails 20 and 22, which are supported by brackets 24 and 26 on the frame 28. A coil spring 30 on the lower guide rail 22 bears against the left-hand bracket 24 and the carriage 18 to impel the latter toward the right. Another spring 32 serves as a buffer between the carriage and a stop. The stop comprises a block 34, positioned on the guide rails 20 and 22 by a long adjusting screw 36, operating through the right-hand bracket 26, and a member pivoted on a shaft 38 and comprising a fork 40 surrounding the lower guide rail 22 between the block and the buffer spring and a shoe 42 held against the upper rail 20 by a spring 44.

A continuous metal belt 46 running in a counterclockwise direction on a driving pulley 48 and an idler pulley 50 passes through slot 52 tapering in the direction of motion of the belt in the lower part of the carriage 18. A ball 54 (Figs. 3 and 4) rests on the belt in the slot where it is held by fingers 56 on a downward prolongation of the pivoted member 16. Clockwise rotation of the pivoted member moves the fingers to the left forcing the ball into the narrower end of the slot where it wedges between the belt and the upper surface of the slot and serves to clamp the carriage to the belt. Conversely, counterclockwise rotation of the pivoted member forces the ball out of the wedged position, releasing the carriage from the belt so that it may be returned to the right by action of the spring 30.

The carriage, on its return, is stopped by the buffer spring 32 (Fig. 1). To ensure that it shall not rebound and perhaps cause the ball 54 to engage the belt 46 prematurely, the hole in the right-hand bracket 26 and the hole in the block 34 through which the upper guide rail 20 passes are elongated to permit a slight vertical movement of the rail. As the carriage strikes the buffer spring, pressure is applied to the fork 40 causing it to move, pressing the shoe 42 more firmly on the upper rail. This causes the rail, in conjunction with the lower rail 22, to exert a squeezing effect on the carriage, bringing it to a quick stop and preventing any rebound.

A shaft 58 having a longitudinal projection, or feather, 60 is mounted parallel to and in front of the carriage guide rails in bearings 62 in the brackets 24 and 26. The feather engages a slot in a horizontal extension 64 of the pivoted member 16 on the carriage 18 so located that rotation of the shaft to raise the feather produces clockwise rotation of the pivoted member causing the ball 54 to grip the belt 46.

Power is applied by a motor 66 through a motor shaft 68 (Figs. 5 and 6). Driving gears 70 (Fig. 5) and 72 (Fig. 6), being of different size and joined together by a short spacer and slidably mounted on the motor shaft, mesh with one or the other of the two driven gears 74 and 76 on a main shaft 78 to provide two speeds of operation. The gears are shifted by means of a roller 80 carried on a shift lever 82 and operating in the annular space between the larger driving gear 70 and a disk 84. The element 80 is preferably made in the form of a roller to minimize the friction between it and the rotating gear 70, for example, when gear 70 is made to mesh with driven gear 74. The shift lever slides on a bar 86 between stops 88. The driving pulley 48 is carried on one end of the main shaft; and a worm 90 at the other end provides power for the paper-moving mechanism hereinafter described.

Figure 2:
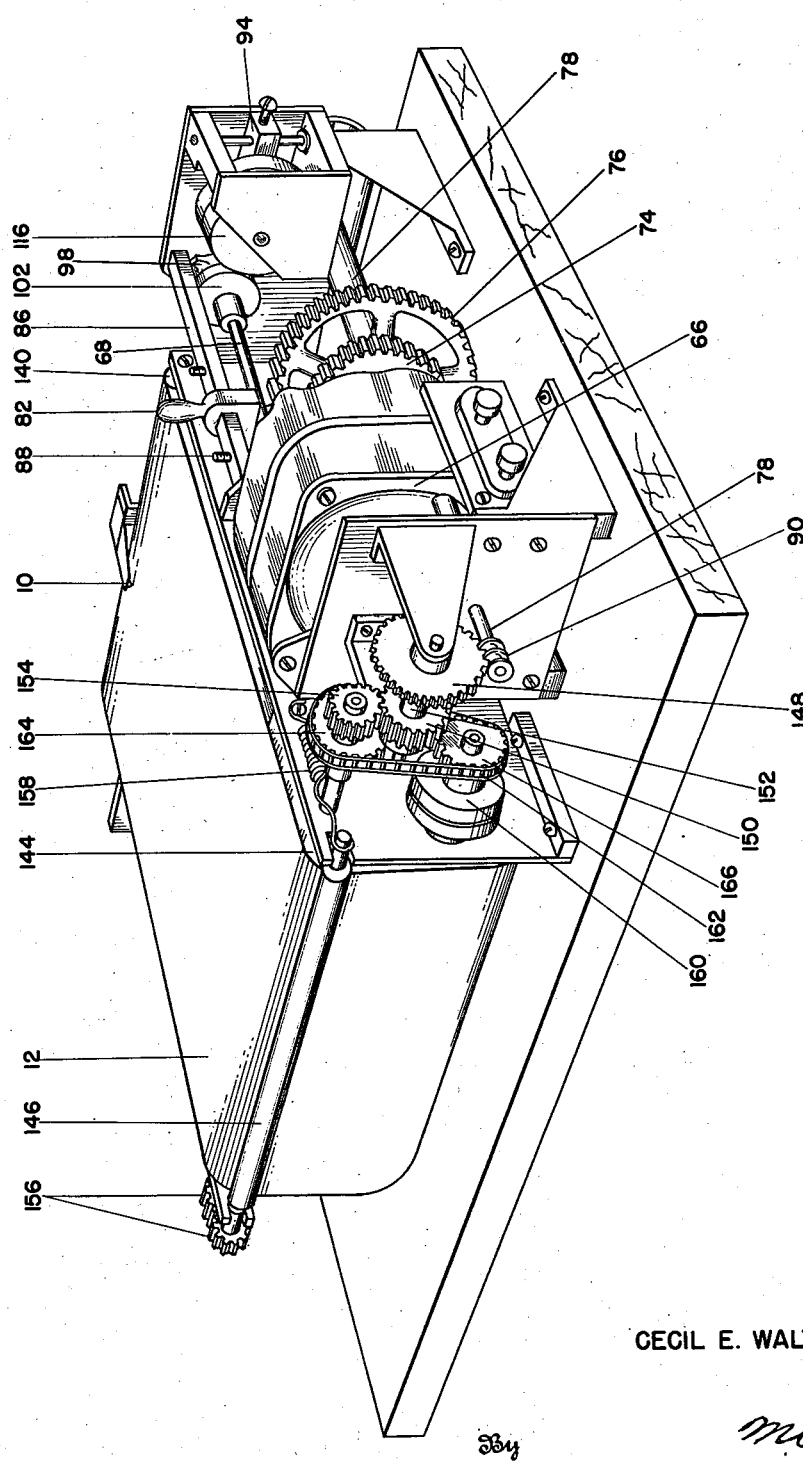
Fig. 2 is a perspective view of the device from the driving-motor side.

The feathered shaft 58 is actuated by a crank 92 rigidly attached thereto, the crank being connected to an arm 94 (Fig. 5) by a connecting link 96 which extends through a hole in the frame 28 and which includes a loose coupling as a means of permitting a limited amount of motion of the arm toward the crank without affecting the latter. The arm is operated by a cam 98 (Figs. 2, 6) rotated by the motor shaft 68 through a friction drive consisting of a felt disk 100 interposed between the cam and a driving disk 102 on the motor shaft. A swinging stop 104 prevents rotation of the cam by contact with an ear 106 thereon, the stop being normally held in position to do this by a spring 108. An actuating rod 110 which extends through frame 28 and parallel to guide rails 20 and 22 terminates in a trigger so placed near the stop block 34 that it is struck by the carriage 18 on its return to pull the swinging stop clear of the ear on the cam, permitting its rotation. The cam, driven by the motor shaft 68, strikes the arm 94 and moves it inward, pulling the connecting link 96 and crank 92 to rotate the feathered shaft 58, lift the horizontal arm 64 on the carriage, move the ball 54 into the wedged position and start the carriage moving. A block 112 on the shaft 58 holds the motion of the shaft within proper limits by contact with two screws 114 carried in the bracket 24.

A solenoid 116 (Fig. 5) acting on an armature 118 on the arm 94 provides a means for initiating operation of the carriage from an external point. It is to be noted that movement of arm 94 slightly inward, to initiate operation of the carriage, may be accomplished either mechanically by means of cam 98 or electrically through the energization of solenoid 116 with the attendant movement of armature 118. When the device is operated in this manner, the swinging stop 104 is blocked by means of a latch or any other similar means (not shown) to render it inoperative.

The distance travelled by the carriage is controlled by a movable trip 120 (Fig. 7) carried by the upper guide rail 20 and extending over the feather 60. This trip has a sloping undersurface which acts as a cam to engage the horizontal arm 64 to push it down and thereby disengage the ball 54. To prevent the horizontal arm from jamming under the trip and failing to cause the ball to release, an oscillating movement is imparted to the rail and trip by a crank 122 on the extremity of the rail 20 which is actuated through a link 124 and a rocker arm 126 by studs 128 on the hub of the driving pulley 48. A spring 130 holds the rocker arm in contact with the studs and is adjusted by a screw 132. The oscillatory movement of the stop ensures that complete disengagement of the ball occurs to permit full return of the carriage; otherwise the ball might grip the belt prematurely.

The paper 12 of the recorder is carried in a removable magazine comprising a frame 134 which includes receptacles for a supply roll 136 and a take-up roll 138. The paper passes from the supply roll over a roller 140 which, with the stylus 10 forms the electrical contact to the paper. From the roller 140 the paper passes over a table 142 and between feed rollers driven by the worm 90 (Fig. 2) through a worm gear 148 and a pinion 150 on a shaft 152 carried in the fixed frame of the instrument. A pinion 154 on an extension of the shaft of the inner feed roller 144 meshes with the pinion 150 when the magazine is in place in the instrument. Pinions 156 on the opposite end of the feed rollers provide a positive drive for the outer roller 146 which is tightened on the paper by springs 158. The take-up roll 138 is driven through a friction clutch 160 by a chain 162 running over sprockets 164 and 166 on the feed-roll and clutch shafts respectively.

In operation the recorder drive of the instant invention functions as follows. The electric motor 66 is first turned on and immediately pulleys 48 and 50 start to rotate so that belt 46 travels at a speed dependent upon the setting of handle 82 and therefore gear 74 or 76. Since the stylus 10 is moving back and forth, transversely across the paper 12, its operation will be described from its starting point at the left-hand margin of the paper. It is to be recalled that just at this point the ranging equipment driver energizes the stylus 10 (over electrical connections not shown) to mark the paper 12 when the transmitter is keyed and a pulse of energy is sent out. At this point the spring 30 is urging carriage 18 to the right as seen in Fig. 1 thereby causing the carriage to push against the U-shaped end of rod 110. Rod 110 moves slightly to the right, due to this urging, and in so doing pulls swing stop 104 out of engagement with ear 106 thereby permitting cam 98 to rotate under the influence of driving disk 102. In rotating, cam 98 strikes arm 94 which, by means of connecting link 96, causes crank 92 to turn slightly thereby rotating slightly the shaft 58 and its attached projection 60 in an upwardly direction as seen in Fig. 1. Since the projection 60 engages a slot in horizontal extension 64 of pivoted member 16, the upward movement of the projection imparts a clockwise rotation to the pivoted member 16 resulting in the ball 54 being moved into the narrow portion of slot 52 (Fig. 3) so that it grips the moving belt thereby causing the carriage 18 and stylus to move across the paper.

Movable trip 120, which is slidable along the shaft 20 and whose function is to release the carriage 18 from the belt, is positioned along the shaft 20 in accordance with the range at which the ranging equipment is operating. As the carriage 18 approaches trip 120, the horizontal extension 64 moves underneath the trip, the lower side of which is slanting so that extension 64 is moved downward. The downward movement of 64 imparts a counterclockwise rotation to member 16 and this in turn moves ball 54 out of the narrow portion of slot 52 to release carriage 18 from the belt. Spring 30, which has been compressed by the movement of the stylus across the paper, returns the carriage to its starting point as soon as the grip on the belt is released. Spring 42 acts as a buffer for the returning carriage and also tilts slightly the block 34 so that shoe 42 exerts a squeezing action on rails 20 and 22 to obviate any rebound by the carriage.

What is claimed is:

1. In a recorder having a movable stylus, a device for controlling movement of the stylus comprising a drive member capable of continuous movement, a clamp carried by the stylus adapted to engage releasably the drive member, said drive member passing through a slot in said clamp, a stop for limiting movement of the stylus in one direction, means for engaging the clamp to move the stylus, a trip for disengaging the clamp at any desired distance from the stop and means for returning the stylus to the stop.

2. A drive mechanism for use in a recorder having a movable stylus, comprising a drive pulley, an idler pulley, an endless belt supported by said pulleys, a stylus carriage, a lever pivotally mounted on the carriage, a clutch operated by the lever for engagement with the belt, said belt passing through a slot in said clutch, means for actuating the lever for clutching at desired time intervals, a trip for actuating the lever for declutching at a desired stylus position, means for returning the stylus carriage from the trip position, a shock absorbing stop for limiting stylus movement at a desired return position, a trigger for starting the actuating means when the carriage is near the stop, and a vibrator for the trip to prevent jamming.

3. In a recorder, a pair of tracks, a movable stylus on the tracks, means for moving the stylus a desired distance and releasing it, a spring for returning the stylus to the starting position, a second spring for cushioning the stylus on its return, a tiltable member mounted on said tracks and in contact with the second spring, a shoe integral with said tiltable member and in contact with one of said tracks, said tiltable member and shoe being actuated by the second spring for squeezing the tracks together to prevent stylus rebound.

4. In a recorder having a movable stylus, a mechanism for controlling movement of the stylus comprising a power source, a pulley driven by said source, an idler pulley, a continuous belt running over said pulleys, a stylus carriage having a tapered slot through which the belt passes, a ball, a lever supporting the ball in the slot, motion of the lever in one direction causing the ball to lock the belt in the slot and motion in another direction releasing the member, a rotatable shaft carrying a projection adapted to engage the lever for actuation of the ball, and means for rotating said shaft when it is desired to lock or release said stylus carriage from the belt.

5. In a recorder having a movable stylus, a mechanism for controlling movement of the stylus comprising a power source, a pulley driven by said source, an idler pulley, a continuous belt running over said pulleys, a stylus carriage having a tapered slot through which the belt passes, a ball, a lever supporting the ball in the slot, motion of the lever in one direction causing the ball to lock the belt in the slot and motion in another direction releasing the member, a rotatable shaft carrying a projection adapted to engage the lever for actuation of said ball, a movable cam adapted to rotate the shaft in one direction, and a trigger arranged to connect the cam to the power source, the trigger being activated when the stylus carriage is in a zero position whereby said ball locks the stylus carriage to the belt for movement therewith.

6. In a recorder having a movable stylus, a mechanism for controlling movement of the stylus comprising a power source, a pulley driven by said source, an idler pulley, a continuous belt running over said pulleys, a stylus carriage having a tapered slot through which the belt passes, a ball, a lever supporting the ball in the slot, motion of the lever in one direction causing the ball to lock the belt in the slot, and motion in another direction releasing the member, a trip set to move the lever in said other direction to release the belt at a desired point of stylus travel and oscillating means operated by the driven pulley and connected to the trip to prevent jamming.

7. In a recorder having a movable stylus, a mechanism for controlling movement of the stylus comprising a power source, a pulley driven by said source, an idler pulley, a continuous belt running over said pulleys, a stylus carriage having a tapered slot through which the belt passes, a ball, a lever supporting the ball in the slot, motion of the lever in one direction causing the ball to lock the belt in the slot, and motion in another direction releasing the member, a rotatable shaft carrying a projection adapted to engage the lever for movement in one direction, a movable cam adapted to rotate the shaft, a trigger arranged to connect the cam to the power source, the trigger being activated when the carriage is in a zero position thereby to lock said carriage to the belt for movement therewith, and a trip set to move the lever in another direction to release the belt at a desired point of stylus travel, and means for returning the carriage to zero position.

8. In a recorder, a movable stylus, a moving record receiving medium in contact with the stylus, a motor, a first gear train driven by said motor, a belt and pulley arrangement driven by said first gear train, a clutch for connecting the stylus to the belt, said belt passing through a slot in said clutch, a second gear train also driven by the motor, and a plurality of rollers driven by the second gear train for guiding the movement of the record receiving medium, said rollers being detachably connected to the second gear train.

9. In a recorder having a movable stylus, a drive motor, a drive pulley connected to the motor and capable of continuous movement, an idler pulley, an endless belt continuously running on said pulleys, a clutch forming a portion of the stylus, said clutch being adapted to engage the belt to thereby move the stylus, said belt passing through a slot in the clutch, a rotatable shaft with a projection thereon, means to rotate the shaft from said motor, said projection contacting the clutch to cause its operation.

CECIL E. WALTON.

REFERENCES CITED

The following references are of record in the file of this patent:

UNITED STATES PATENTS

| Number | Name | Date |
| --- | --- | --- |
| 274,812 | Needham | Mar. 27, 1883 |
| 581,136 | Preece | Apr. 20, 1897 |
| 1,600,326 | Endsley | Sept. 21, 1926 |
| 1,964,632 | Hays | June 26, 1934 |
| 2,215,542 | Chappell et al. | Sept. 24, 1940 |
| 2,355,502 | Barton | Aug. 8, 1944 |